Patented Apr. 21, 1953

2,636,064

UNITED STATES PATENT OFFICE 2,636,064

ALKALINE ELECTRICAL BATTERY

Walter H. Taylor, Williamstown, Mass., assignor to Sprague Electric Company, North Adams, Mass., a corporation of Massachusetts No Drawing. Application October 23, 1950, Serial No. 191,727

3 Claims. (Cl. 136—137)

This invention relates to improved electrical batteries and more specifically refers to a depolarizer composition with unusual characteristics.

Mercuric oxide and silver oxide have been proposed and are being used in substantial quantities and as oxidizing agents in primary cells. They are characterized by a high electrical capacity per unit volume, constancy of voltage during discharge and good performance on high current drains. The alkaline primary cells in which they are employed are used for military communication batteries, for hearing aid devices and the like, where size and performance are important criteria. Unfortunately, however, both of the oxides are relatively expensive as compared to manganese dioxide, and are ordinarily not capable of being used in rechargeable batteries.

It is an object of the present invention to overcome the foregoing and related disadvantages. It is a further object to produce new and improved depolarizer compositions, particularly for alkaline batteries. A still further object is to produce a depolarizer composition for rechargeable alkaline zinc cells. Additional objects will become apparent from the following description and claims.

These objects are attained in accordance with the present invention wherein there is produced a compressed depolarizer composition for batteries comprising particles of an oxidizing agent selected from the class containing mercuric oxide and silver oxide, particles of a conductor selected from the class containing graphite and carbon and a liquid electrolyte, the ratio between the above being from about 4:1:2 to about 25:1:2.

In a more restricted sense the invention is concerned with a compressed depolarizer for alkaline zinc cells comprising from about 80 parts to 97 parts of particles of mercuric oxide, from about 20 parts to about 3 parts of particles of graphite and from about 5 parts to about 15 parts of an aqueous solution of cell alkaline electrolyte.

Particle size of the mercuric oxide is preferably between about 15 and about 60 microns on the average and the particle size of the graphite is preferably between about 2 and about 10 microns average.

In the past, mercuric oxide depolarizers for alkaline primary cells have ordinarily consisted of from about 9 to about 19 parts of mercuric oxide to 1 part of graphite pelleted and consolidated under extremely high pressure, that is, on the order of 10 to 20 tons per square inch. It was considered that the highly compressed depolarizer possessed a maximum electronic conductivity and consequently was ideal for high current drain and/or low temperature service. I have discovered that considerably improved results on high drain service and on low temperature service are obtained through use of what may be referred to as a "porous" depolarizer, the pores of which are filled with liquid electrolyte.

The depolarizer of my invention consists of an oxidizing agent, either mercuric oxide or silver peroxide, an electronic conducting and binding agent, either carbon or graphite, and liquid alkaline electrolyte. The oxide serves the usual function in the electrochemical system and the graphite or carbon maintains electronic contact between oxide particles and the container, usually a metal can. The liquid electrolyte contacts an extremely large surface area of the oxide-conductor mix and results in a greatly increased effective surface area for the electrochemical reaction. The ratio of the three components given above is usually from about 25:1:2 to about 4:1:2, respectively.

In the case of mercuric oxide employed in an alkaline zinc cell system, I prefer to maintain a ratio of about 80 to about 97 parts of mercuric oxide, from about 3 to about 20 parts of graphite and from about 5 to about 25 parts of liquid electrolyte.

The depolarizer is ordinarily prepared by thoroughly mixing the oxide and the electronic conductor in a mill and pelleting and consolidating the mix in a depolarizer container under low pressure. The pressure is ordinarily from about 500 to about 4000 pounds per square inch. If the particle sizes of oxide and electronic conductor previously specified are employed, a porous pellet will result. The porous pellet in its container is thereafter treated with a liquid electrolyte to fill the pores, probably thru capillary action.

While depolarizers produced in a manner indicated above are characterized by high efficiency in primary alkaline cells, it is also contemplated that systems may employ the depolarizer. The high compression depolarizers of the prior art have not been fully satisfactory for use in rechargeable systems.

As an example, an alkaline-zinc-mercuric oxide cell was made up with the following structure. (a) Anode—4.50 grams zinc powder amalgamated with about 5% mercury; (b) Electrolyte—about 7 grams of a mixture of 100 parts by weight of potassium hydroxide (85%), 13 parts zinc oxide and 100 parts water. 4 grams of carboxy methyl cellulose were dissolved in 100 cc. of the solution and the mixture heated to form a liquid which gelled upon cooling. (c) Depolarizer—The standard depolarizer consisted of 95 parts of mercuric oxide and 5 parts of synthetic graphite with the particle size of about 10 and about 0.5 microns, respectively. This depolarizer was pelleted and consolidated at 20 tons per square inch. The depolarizer of the invention employed the same ratio, but was consolidated at about 3800 pounds per square inch and employed solid particle sizes of about 26 and about 3 microns for the mercuric oxide and graphite respectively. The dry depolarizers weighed 16.1 grams in the case of the control type and 14.6 grams in the case of the porous type. The latter was impregnated with 6 drops of a solution of 100 grams of potassium hydroxide in 100 grams of water.

The cells were tested at 20° F. on a 32 ohm load under which conditions the cell of the invention gave 10 times the life to a 0.9 v. end potential. On a current drain of 200 mils (using a 5 ohm load) the life of the cell employing the depolarizer of the invention was approximately 3 times that of the control cell to a 0.8 v. end potential. Four hours were obtained on 5 ohms for the control cell, whereas 13 hours were noted for the cell of the invention.

The recharging of cells employing the depolarizer of the invention may be conducted at reasonable rates and repeated for a number of times without excessive loss of subsequent discharge efficiency.

In addition to synthetic graphite, natural graphite, acetylene carbon black and related materials possessing electronic conductivity and a particle size in the specified range may be employed.

As many different embodiments of this invention may be made without departing from the spirit and scope hereof, it is to be understood that the invention is not limited to the specific embodiments hereof except as defined in the appended claims.

What I claim is:

1. A process of producing a porous depolarizer for batteries which comprises admixing particles of an oxidizing agent selected from the class consisting of mercuric oxide and silver oxide, and particles of conductive carbon, pressing said mixture of particles together with a pressure of from 500 to about 4000 lbs. per square inch, and impregnating the so-pressed pellet with a liquid electrolyte, the ratio of the oxidizing agent, the carbon particles, and the electrolyte in the so-pressed pellet being from about 4-to-1-to-2 to about 25-to-1-to-2, said oxidizing particles range in diameter from about 15 to about 60 microns, and wherein said carbon particles range in diameter from about 2 to about 10 microns.

2. A process for producing a compressed depolarizer for alkaline zinc dry cells which comprises admixing from about 80 to about 97 parts of particles of mercuric oxide from about 3 to about 20 parts of particles of graphite, forming said mixture into a porous pellet utilizing a pressure of from about 500 to about 4000 lbs. per square inch, an impregnating said pellet with from about 5 to about 15 parts of liquid electrolyte, said mercuric oxide particles range in diameter from about 15 to about 60 microns, and wherein said graphite particles range in diameter from about 2 to about 10 microns.

3. A primary dry cell comprising a container, an amalgamated zinc anode therein, a porous compressed depolarizer composition comprising particles of an oxidizing agent selected from the class of mercuric oxide and silver oxide, particles of a conductive carbon, and a liquid electrolyte, the ratio between the oxidizing agent, the carbon, and the liquid electrolyte being from about 4-to-1-to-2 to about 25-to-1-to-2, and an eletrolyte between and in contact with said anode and said depolarizer, said oxidizing particles range in diamter from about 15 to about 60 microns, and wherein said carbon particles range in diameter from about 2 to about 10 microns.

WALTER H. TAYLOR.

References Cited in the file of this patent

UNITED STATES PATENTS

| Number | Name | Date |
|---|---|---|
| 2,422,045 | Ruben | June 10, 1947 |
| 2,458,878 | Ruben | Jan. 11, 1949 |
| 2,473,546 | Ruben | June 21, 1949 |
| 2,481,539 | Ruben | Sept. 13, 1949 |
| 2,528,891 | Lawson | Nov. 7, 1950 |
| 2,542,574 | Ruben | Feb. 20, 1951 |